United States Patent
Lee et al.

(10) Patent No.: US 7,348,365 B2
(45) Date of Patent: Mar. 25, 2008

(54) COLLOID SOLUTION OF METAL NANOPARTICLES, METAL-POLYMER NANOCOMPOSITES AND METHODS FOR PREPARATION THEREOF

(75) Inventors: Mu Sang Lee, 670-29 Manchon1-dong, Suseong-gu, Daegu-city (KR); Sang Il Nam, 1537-12 Pyeongri5-dong, Seo-gu, Daegu-city (KR); Eun Sun Min, Daegu (KR); Seung Bin Kim, Pohang (KR); Hyun Suk Shin, Pohang (KR)

(73) Assignees: Postech Foundation, Pohang (KR); Mu Sang Lee, Daegu (KR); Sang Il Nam, Daegu (KR)

( * ) Notice: Subject to any disclaimer, the term of this patent is extended or adjusted under 35 U.S.C. 154(b) by 151 days.

(21) Appl. No.: 10/476,418

(22) PCT Filed: Apr. 30, 2002

(86) PCT No.: PCT/KR02/00800

§ 371 (c)(1),
(2), (4) Date: Oct. 30, 2003

(87) PCT Pub. No.: WO02/087749

PCT Pub. Date: Nov. 7, 2002

(65) Prior Publication Data

US 2004/0147618 A1    Jul. 29, 2004

(30) Foreign Application Priority Data

Apr. 30, 2001 (KR) ................................ 2001-23471
Apr. 16, 2002 (KR) ................................ 2002-20593
Apr. 16, 2002 (KR) ................................ 2002-20594

(51) Int. Cl.
*B01F 3/12* (2006.01)
*B01F 17/00* (2006.01)

(52) U.S. Cl. ................................ 516/78; 516/77; 516/9
(58) Field of Classification Search .................. 516/33, 516/78

See application file for complete search history.

(56) References Cited

U.S. PATENT DOCUMENTS

| 4,629,709 A | 12/1986 | Cofler |
| 5,431,967 A | 7/1995 | Manthirum et al. |
| 5,560,960 A | 10/1996 | Singh et al. |
| 5,912,069 A | 6/1999 | Yializis et al. |

FOREIGN PATENT DOCUMENTS

| DE | 19639632 A1 | 9/1998 |
| JP | 61011130 | 1/1986 |
| JP | 8240823 | 9/1996 |
| KR | 2002-43363 A | 6/2002 |

OTHER PUBLICATIONS

Zhu et al., γ-Radiation synthesis and characterization of Polyacrylamide-silver nanocomposites, Chem. Commun., 1997, 1081-1082.*

Yin et al., Synthesis and characterization of poly(butyl acrylate-co-styrene)-silver nanocomposites by γ radiation in W/O emulsions, Chem. Commun., 1998, 941-942.*

Zhu et al., Preparation of nanocrystalline silver particles by γ-ray radiation combined with hydrothermal treatment, Materials Letters, 17 (1993), 314-318.*

Marignier et al., Microaggregates of non-noble metals and bimetallic alloys prepared by radiation-induced reduction, Nature, 317 (Sep. 16, 1985), 344-345.*

* cited by examiner

*Primary Examiner*—Randy Gulakowski
*Assistant Examiner*—Timothy J. Kugel
(74) *Attorney, Agent, or Firm*—Rothwell, Figg, Ernst & Manbeck P.C.

(57) ABSTRACT

A metal nanoparticle colloid solution, metal-polymer nanocomposites, and methods for preparing the same are provided. The metal nanoparticle colloid solution and the metal-polymer nanocomposites can be prepared with a variety of polymeric stabilizers and have uniform particle diameter and shape. The metal nanoparticle colloid solution and the metal-polymer nanocomposites have wide applications, for example, as an antibacterial agent, a sterilizer, a conductive adhesiv, conductive ink or an electromagnetic wave shielder for an image display.

11 Claims, 9 Drawing Sheets

US 7,348,365 B2

COLLOID SOLUTION OF METAL NANOPARTICLES, METAL-POLYMER NANOCOMPOSITES AND METHODS FOR PREPARATION THEREOF

BACKGROUND OF THE INVENTION

1. Field of the Invention

The present invention relates to a colloid solution of metal nanoparticles, metal-polymer nanocomposites, and methods for preparing the same, and more particularly, to a metal colloid solution and metal-polymer nanocomposites prepared using a variety of polymeric stabilizers and having a uniform particle diameter, and methods for preparing the same.

2. Description of the Related Art

Recently, a method for preparing a colloidal dispersion of silver nanoparticles using gamma rays and appropriate stabilizers, such as polyvinyl alcohol and sodium dodecyl sulfate (SDS) was disclosed (*Nature* 1985, 317, 344; *Materials Letters* 1993, 17, 314). The preparation method using gamma rays was reported to provide uniform diameter distribution of the silver nanoparticles. The metal nanoparticles prepared by those methods were known to have a size of from about 8 nm to tens of nanometers from the outstanding research reports. However, the metal nanoparticles are prepared by these methods not so desirable in terms of particle diameter and shape uniformity.

It is important to obtain pure silver particles having a uniform shape within a narrow distribution range of particle diameters for industrial applications. For example, ultrafine silver particles are essential materials in the electronics applications, for example, for conductive ink and paste and adhesive applied in the manufacture of a variety of electronic parts.

As described above, there is a need for a new method for preparing metal nanoparticles having a uniform size and shape. In addition, good dispersion stability for preventing agglomeration of metal nanoparticles in a dispersion medium is another consideration for industrial applications. For diversified industrial applications, miscibility with a variety of organic solvents, plasticizers, and resins is required to prepare a metal colloid solution in a non-aqueous medium.

A variety of methods for preparing a solid phase of polymer-metal nanocomposites were suggested (*Polym. Composites* 1996, 7, 125; *J. Appl. Polym. Sci.* 1995, 55, 371; *J. Appl. Polym. Sci.* 1996, 60, 323). These methods involve two steps: (1) polymerization of monomer particles and (2) reduction of metal ions in a polymerized medium. However, the separate polymerization and reduction processes cause non-uniform size distribution of the metal nanoparticles in the polymerized medium.

To solve this problem, a method for preparing silver-polymer nanocomposites using gamma rays was developed (*Chem. Commun.* 1997, 1081). In the method, a silver salt is dissolved in water, mixed with acrylic amide as a water-soluble monomer, and subjected to gamma-rays irradiation to prepare the silver-polymer nanocomposites. Here, reduction of silver ions coincides with polymerization of the monomer, so that the metal nanoparticles are comparatively uniformly dispersed in the polymerized medium.

However, this method also cannot be applied when using a variety of water-insoluble monomers. To overcome the limitation encountered when using an aqueous medium, the preparation of silver-polymer nanocomposites from a water-in-oil (W/O) emulsion was reported (*Chem. Commun.* 1998, 941), wherein toluene was used for the oil phase.

According to the method, since a variety of water-insoluble monomers can be applied, various kinds of metal-polymer nanoparticles can be prepared. However, the use of excess toluene for the oily medium, up to about 5 times the amount of water, causes environmental concerns. In addition, a safe working environment is not guaranteed due to a high risk of explosion in its preparation.

SUMMARY OF THE INVENTION

Accordingly, it is an object of the present invention to provide a colloid solution of metal nanoparticles having a uniform particle characters and a method for preparing the same.

It is another object of the present invention to provide metal-polymer nanocomposites having a uniform particle characters and a method for preparing the same.

In one aspect, the present invention provides a method for preparing a metal nanoparticle colloid solution, comprising: dissolving a metal salt and a water-soluble polymer in water, a non-aqueous solvent, or a solvent mixture of water and a non-aqueous solvent; purging a reaction container containing the solution with nitrogen or argon gas; and radiating radioactive rays onto the solution.

In the preparation method, the water-soluble polymer includes polyvinyl pyrrolidone, a copolymer having vinyl pyrrolidone as a first polymerization unit, and a fatty acid-substituted or unsubstituted polyoxyethylene. The copolymer having vinyl pyrrolidone as the first polymerization unit includes (1-vinyl pyrrolidone)-acrylic acid copolymer, (1-vinyl pyrrolidone)-vinyl acetic acid copolymer, (1-vinyl pyrrolidone)-styrene copolymer, and (1-vinyl pyrrolidone)-vinyl alcohol copolymer. The fatty acid-substituted polyoxyethylene includes polyoxyethylene stearate and polyoxyethylene palmitate.

In another aspect, the present invention provides a metal nanoparticle colloid solution prepared by the preparation method described above.

In another aspect, the present invention provides a method for preparing metal-polymer nanocomposites, comprising: dissolving a metal salt and a polymeric stabilizer in a solvent mixture of water and a non-aqueous solvent; purging a reaction container containing the solution with nitrogen or argon gas; and radiating radioactive rays onto the solution to obtain precipitates.

In the preparation method of the metal-polymer nanocomposites, the polymeric stabilizer is at least one polymer selected from the group consisting of polyethylene, polyacrylonitrile, poly(methyl (meth)acrylate), polyurethane, polyacrylamide, and polyethylene glycol.

According to the present invention, the colloid solution of metal nanoparticles and the metal-polymer nanocomposites have favorable stability, a uniform shape, and a small diameter within a narrow distribution range, so that the colloid solution of metal nanoparticles and the metal-polymer nanocomposites have wide, effective applications, for example, as an antibacterial agent, a deodorizing agent, a conductive adhesive, conductive ink, and a electromagnetic wave shielder for an image display.

The formation of the silver nanoparticles will be described in greater detail. Electrons are generated in a solvent by gamma-rays irradiation and reduce silver ions in a solution. Reduced silver atoms agglomerate to form a silver cluster and become larger. In this case, when an appropriate polymeric stabilizer is added, the agglomeration of the silver atoms can be prevented to result in nano-sized silver particles. Polymeric stabilizers stabilize the nanoparticles in a colloid state through steric repulsion as well as prevent the silver clustering. The gamma-rays irradiation produces radicals as well as the electrons in the solvent. To remove the radicals, a scavenger, such as alcohol, is used. Oxygen present in the solution is removed by nitrogen or argon purging before the gamma-rays irradiation, to prevent side reactions by the oxygen.

To prepare the colloid solution of metal nanoparticles according to the present invention, any metal salt capable of forming a general nanoparticle colloid solution can be used without limitations. However, in terms of conductivity and economical reasons, a salt of at least one metal selected from the group consisting of silver, copper, nickel, palladium, and platinum is preferable, with the silver salt being more preferable.

The metal salt is, for example, nitrate, sulfate, hydrochloride, perchlorate, or acetate. According to the present invention, a silver salt, such as $AgNO_3$, $AgClO_4$, $Ag_2SO_4$, or $CH_3COOAg$ is more preferred. These silver salts are well dissolved in water and thus form an aqueous colloid of silver nanoparticles.

In the preparation of the colloid solution of metal nanoparticles according to the present invention, a water-soluble polymer, preferably, having a weight average molecular weight of 2,000-2,000,000, is used as a stabilizer for improving dispersion of the metal nanoparticles. Suitable stabilizers include, for example, polyvinyl pyrrolidone, a copolymer including vinyl pyrrolidone as a first polymerization unit, and a fatty acid-substituted or unsubstituted polyoxyethylene.

The copolymer including vinyl pyrrolidone as a first polymerization unit may further include an acrylic acid, styrene, vinyl acetate, or vinyl alcohol as a second polymerization unit. Examples of the copolymer include (1-vinyl pyrrolidone)-acrylic acid copolymer and (1-vinyl pyrrolidone)-vinyl acetic acid copolymer. The copolymer includes the first and second polymerization units in a weight ratio of 1:99-99:1, and preferably, 20:80-80:20. Preferably, the (1-vinyl pyrrolidone)-acrylic acid copolymer includes a 1-vinyl pyrrolidone repeating unit and an acrylic acid repeating unit in a weight ratio of 75:25. Preferably, the (1-vinyl pyrrolidone)-vinyl acetic acid copolymer includes a 1-vinyl pyrrolidone repeating unit and a vinyl acetic acid repeating unit in a weight ratio of 57:43.

Regarding the fatty acid-substituted polyoxyethylene, which is a water-soluble polymer used as the stabilizer, the fatty acid is palmitic acid, oleic acid, linoleic acid, or stearic acid, with the stearic acid being more preferred.

Any solvent capable of dissolving the water-soluble polymer and metal salt therein can be used without limitations. For example, water, a non-aqueous solvent, or a mixture of these solvents can be used. Suitable non-aqueous solvents include alcoholic solvents, and typically, isopropyl alcohol, methanol, ethanol, ethylene glycol, or a mixture including at least two of the forgoing solvents.

The non-aqueous solvents also act as a scavenger for removing radicals during gamma-rays radiation as well as act as a solvent for the metal salt and water-soluble polymer.

According to the present invention, the water-soluble polymer is used in an amount of 0.1-10 parts by weight based on 100 parts of the solvent by weight. If the water-soluble polymer is used in an amount of less than 0.1 parts by weight, it is difficult to provide the effect of the stabilizer. If the water-soluble polymer is used in an amount of greater than 10 parts by weight, the particle size undesirably increases.

According to the present invention, the metal salt is used in an amount of 0.01-5 parts by weight based on 100 parts of the solvent by weight. If the metal salt is used in an amount of less than 0.01 parts by weight, it is difficult to provide the effect of the metal salt. If the metal salt is used in an amount of greater than 5 parts by weight, the particle size increases, or the particles slightly precipitate.

In the preparation of the colloid solution of metal nanoparticles according to the present invention, a water-soluble polymer and a metal salt are dissolved in a solvent. A reaction container containing the solution is purged with nitrogen ($N_2$) or argon (Ar) gas for 10 minutes to 10 hours and tightly sealed.

Next, the resultant product is irradiated with radioactive rays, and preferably, gamma rays, to a radiation dosage of 10-50 KGy. As a result, the colloid solution of metal nanoparticles having a much smaller particle diameter of about 1-5 nm than those prepared by conventional methods, within a narrow distribution of particle diameters, is obtained.

In the colloid solution of metal nanoparticles prepared by the method according to the present invention, a post-process of diluting the source solution and ultrasonic treatment may be performed to decompose the metal nanoparticles further into much smaller metal particles. The post-process supports the fact that the adsorption and steric repulsion mechanism of polymers enables the formation of the metal nanoparticles and ensures dispersion stability. In particular, very small metal nanoparticles are surrounded and adsorbed by the polymeric stabilizer to form clusters of the polymeric stabilizer-adsorbed metal nanoparticles. Since the clusters of the metal nanoparticles agglomerate, the metal nanoparticles forming the colloid appear to be much larger after the radioactive-rays irradiation. Accordingly, when the colloid of the metal nanoparticles is diluted and subjected to the ultrasonic treatment, the clusters of the metal nanoparticles are decomposed further into much smaller metal particles.

In the present invention, the much smaller particle diameter and narrower distribution of particle diameters, compared to when conventional methods are applied, are believed to be due to the use of the water-soluble polymeric stabilizer, such as polyvinyl pyrrolidone, (1-vinyl pyrrolidone)-acrylic acid copolymer, polyoxyethylene stearate, and (1-vinyl pyrrolidone)-vinyl acetic acid copolymer.

The metal nanoparticles having a very small diameter prepared in the present invention have a very large surface area-to-volume ratio, and thus they provide good antibacterial activity and conductivity even when only a trace is used. Therefore, the colloid solution of the metal nanoparticles according to the present invention can be used as an antibacterial agent, a sterilizer, a deodorizing agent, an electromagnetic wave shielder, and conductive adhesive and ink.

For diversified industrial applications, the metal nanoparticles according to the present invention need to be miscible with a variety of organic solvents, plasticizers, and resins to prepare a non-aqueous colloid solution of the metal nanoparticles. In this case, a non-aqueous solvent, which does not contain water, i.e., an alcoholic solvent, can be used alone as the solvent. The alcoholic solvent acts as a scavenger as well as the solvent, and thus is favorable for economical reasons. Among the above-listed kinds of alcoholic solvents, the ethylene glycol is more preferred as the solvent and scavenger.

For the miscibility with a variety of resins, plasticizers, and solvents, instead of the ethylene glycol used as a non-aqueous alcohol, isopropyl alcohol can be used as the solvent and scavenger. In this case, the metal nanoparticles are miscible with alcohol-soluble resins, alcohol-soluble plasticizers, such as dioctyl phthalate (DOP), and organic solvents.

In another aspect, the present invention provides a solid paste of metal-polymer nanocomposites. The solid paste of the metal-polymer nanocomposites is prepared by a similar method as that applied to prepare the colloid solution of the metal nanoparticles as described above, except that polyacrylamide or polyethylene glycol is used as a polymeric stabilizer. The polyacrylamide and polyethylene glycol are water-soluble polymers and precipitate the metal-polymer nanocomposites when dissolved in a solvent together with a metal salt, followed by radioactive-rays irradiation.

In the preparation of the solid paste of the metal-polymer nanocomposites, when a water-insoluble stabilizer, such as poly(methyl (meth)acrylate), polyacrylonitrile, or polyurethane, is used, a surfactant, for example, polyoxyethylene sorbitan mono-oleate, which is commercially available in the trade name of SPAN-80™, TWEEN-81™, or TWEEN-80™, is added. In this case, it is preferable to initially form an emulsion with the addition of the surfactant. The surfactant is added little by little until the emulsion is formed.

As in the preparation of the colloid solution of the metal nanoparticles, in the preparation of the solid paste of the metal-polymer nanocomposites, it is preferable to use a mixture of water and a non-aqueous solvent as the solvent, instead of using water or the non-aqueous solvent alone.

In the preparation of the solid paste of the metal-polymer nanocomposites, it is preferable that the metal salt is added in an amount of 0.01-5 parts by weight based on 100 parts of the solvent by weight. If the metal salt is added in an amount of less than 0.01 parts by weight, the effect of adding the metal salt is negligible. If the metal salt is added in an amount of greater than 5 parts by weight, the particle size increases.

In the preparation of the metal-polymer nanocomposites according to the present invention, the polymeric stabilizer is added in an amount of about 0.1-10 parts by weight based on 100 parts of the solvent by weight. If the amount of the polymeric stabilizer is less than 0.1 parts by weight, the effect of adding the polymeric stabilizer is negligible. If the amount of the polymeric stabilizer exceeds 10 parts by weight, the particle size increases, and the addition of the polymeric stabilizer such an amount is uneconomical.

In the preparation of the metal-polymer nanocomposites according to the present invention, the polymeric stabilizer and metal salt are dissolved in a solvent, and a reaction container containing the solution is purged with nitrogen or argon gas for 30 minutes to 10 hours and completely tightened. Next, the solution is irradiated with gamma rays of a radiation dosage of about 10-50 KGy, followed by solvent removal and vacuum drying to attain the metal-polymer nanocomposites according to the present invention.

The metal-polymer nanocomposites according to the present invention have a uniform particle diameter at room temperature. Since greatly diversified kinds of polymers can be applied to the metal-polymer nanocomposites, unlike conventional methods using monomers to prepare metal-polymer nanocomposites, it is easy to control the molecular weight. In addition, due to a great surface area-to-volume ratio of the metal-polymer nanocomposites, favorable effects, for example, in terms of antibacterial activity and conductivity, are provided with a trace of the metal-polymer nanocomposites. The metal-polymer nanocomposites can be effectively used as an antibacterial agent, a sterilizer, a deodorizing agent, a conductive adhesive, and conductive ink.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will be described in greater detail with reference to the following examples. The following examples are for illustrative purposes and are not intended to limit the scope of the invention.

EXAMPLE 1

Silver Nanoparticle Colloid Solution Prepared by Using (1-vinyl Pyrrolidone)-Acrylic Acid Copolymer as a Stabilizer 1.863 g $AgNO_3$, 395 g isopropyl alcohol, and 11.137 g (1-vinyl pyrrolidone)-acrylic acid copolymer in a weight ratio of 75:25, having a molecular weight (MW) of 96,000, were thoroughly dissolved in 592 g water. A reaction container containing the solution was purged with nitrogen gas for 1 hour and completely tightened, followed by gamma-rays radiation of a dosage of 30 KGy, thereby to prepare a yellow silver nanoparticle colloid solution.

Particle diameter distribution and particle shape were observed for the prepared silver nanoparticle colloid solution by using a transmission electron microscope (TEM). The results are shown in FIG. 1.

Figure 1:
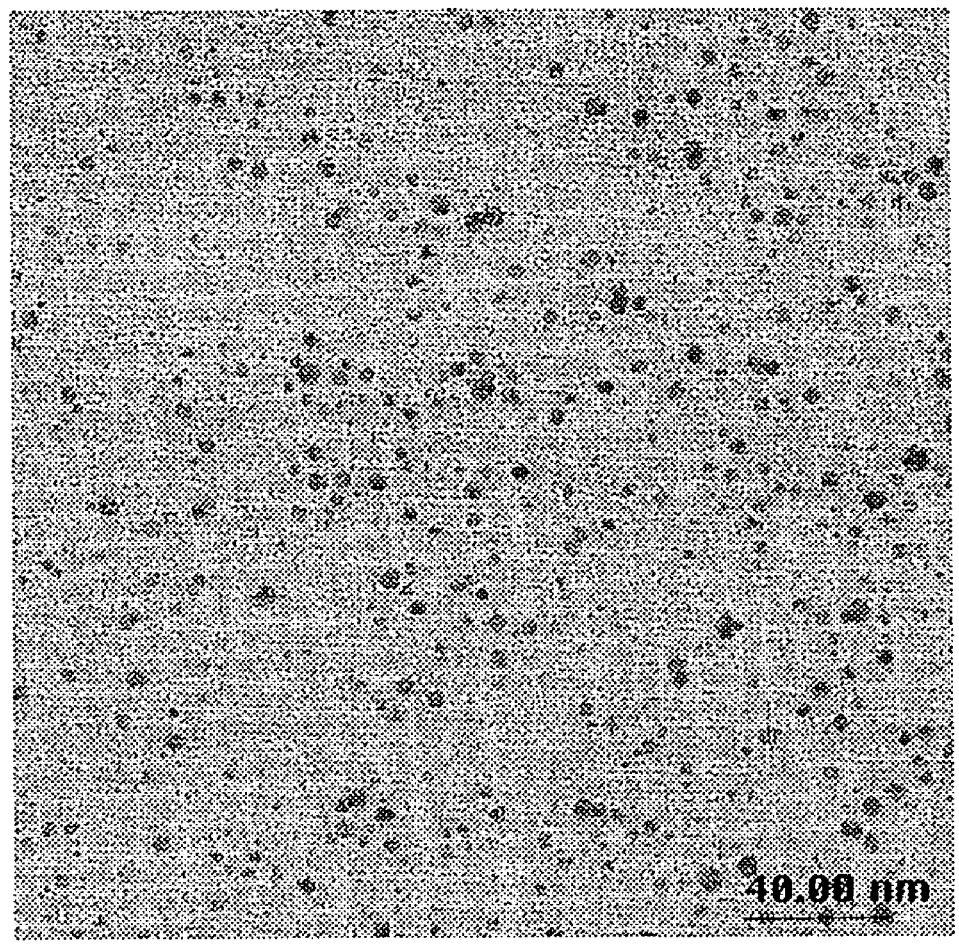
FIG. 1 shows a transmission electron microscopic (TEM) photograph and particle diameter distribution of silver nanoparticles prepared in Example 1 according to the present invention.
Figure 1:
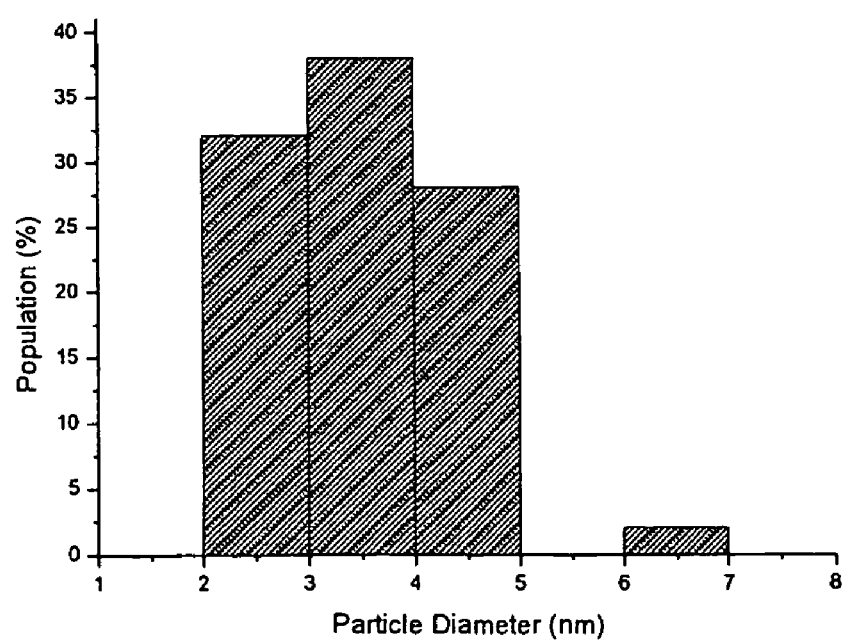

As shown in FIG. 1, the silver nanoparticle colloid solution had a very uniform particle diameter distribution and a uniform particle shape. Most of the particles had a diameter of 3.0±0.9 nm on average, which is the smallest among silver nanoparticles prepared by gamma-rays irradiation, which have been reported to date.

Figure 2:
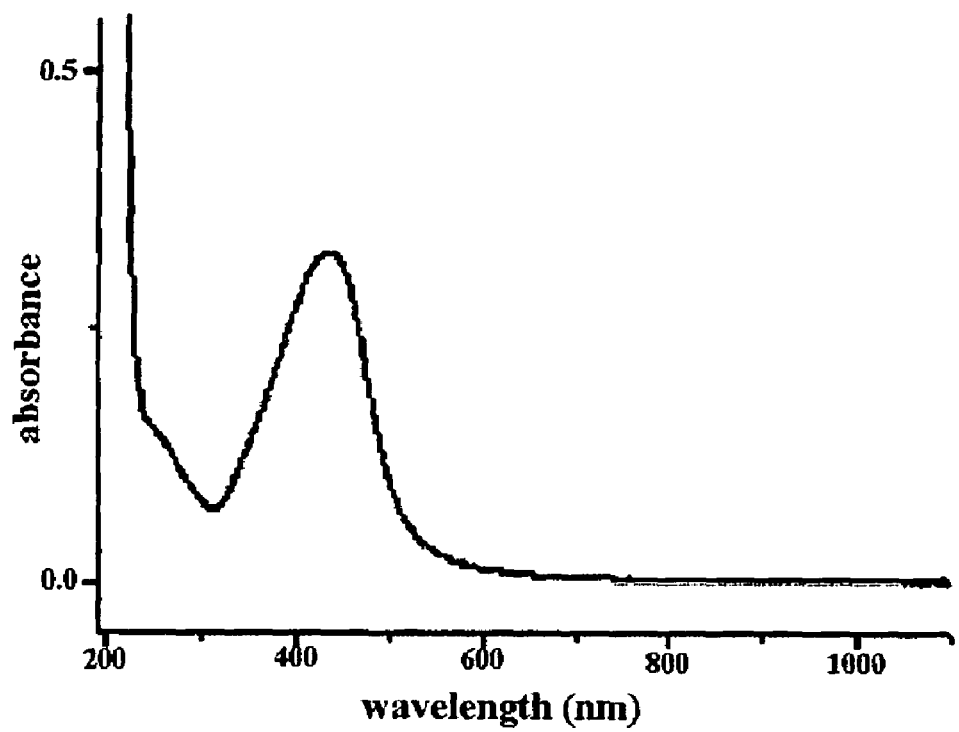
FIG. 2 shows the UV/VIS absorption spectrum of the silver nanoparticles prepared in Example 1 according to the present invention at 405 nm.

The formation of the silver nanoparticles was identified by UV/VIS spectrometry. The result is shown in FIG. 2. As shown in FIG. 2, an absorption peak of the silver nanoparticles appeared at 405 nm.

EXAMPLE 2

Silver Nanoparticle Colloid Solution Prepared by Using Polyvinyl Pyrrolidone as a Stabilizer A silver nanoparticle colloid solution was prepared in the same manner as in Example 1, except that 11.137 g polyvinyl pyrrolidone having a MW of 55,000 was used as the stabilizer, instead of the (1-vinyl pyrrolidone)-acrylic acid copolymer. The resultant silver nanoparticle colloid solution had a minimum particle diameter of 6.6±1.1 nm and an average particle diameter of about 10-12 nm.

EXAMPLE 3

Silver Nanoparticle Colloid Solution Prepared by Using Polyoxyethylene Stearate as a Stabilizer A silver nanoparticle colloid solution was prepared in the same manner as in Example 1, except that 11.137 g polyoxyethylene stearate having a MW of ~2,000 was used as the stabilizer, instead of the (1-vinyl pyrrolidone)-acrylic acid copolymer. The resultant silver nanoparticle colloid solution had an average particle diameter of 7.5±1.8 n m.

EXAMPLE 4

Figure 3:
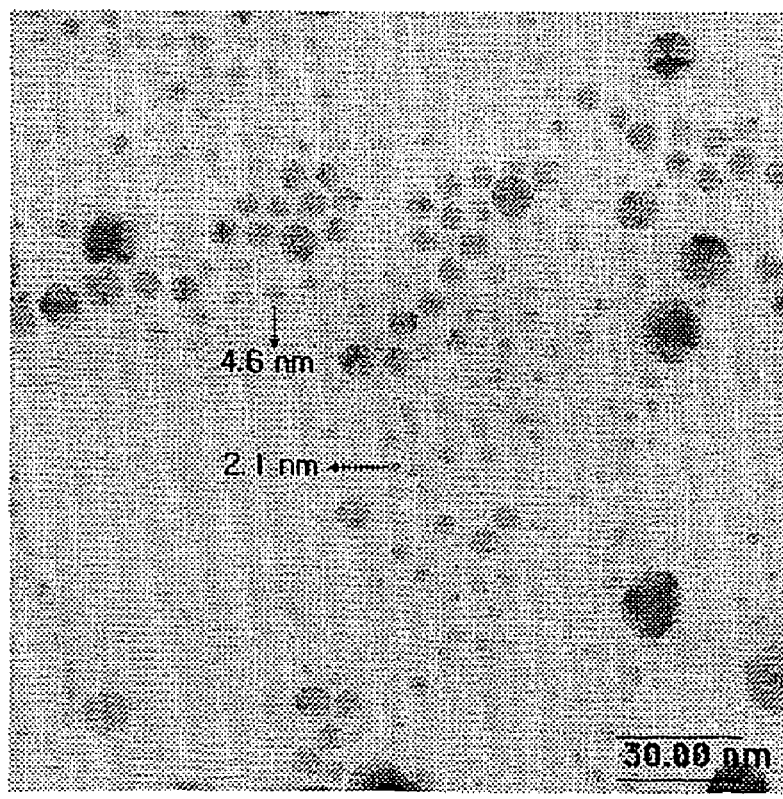
FIG. 3 is a TEM photograph after dilution with water and ultrasonic treatment of the silver nanoparticles prepared in Example 2 according to the present invention.

Particle Diameter of Silver Nanoparticle Colloid Solution Prepared by Using Polyvinyl Pyrrolidone as a Stabilizer After Dilution and Ultrasonic Treatment The silver nanoparticle colloid solution (having an average particle diameter of 12.1±1.6 nm) prepared in Example 2 was diluted 20 folds with water and subjected to ultrasonic treatment for 3 hours and particle diameter measurement. The result is shown in FIG. 3. As shown in FIG. 3, after the dilution and the ultrasonic treatment, particles of a diameter of ~2 nm and ~4 nm appeared. This result supports that the particle diameter can be further reduced by dilution and ultrasonic treatment. Apparently, a number of very small unit silver nanoparticles on which polyvinyl pyrrolidone is adsorbed form the silver nanoparticle colloid solution.

EXAMPLE 5

Silver Nanoparticle Colloid Solution Prepared by Using Ethylene Glycol as a Solvent and Polyvinyl Pyrrolidone as a Stabilizer A non-aqueous, yellow silver nanoparticle colloid solution was prepared in the same manner as in Example 1, except that 987 g ethylene glycol was used, instead of the isopropyl alcohol and water.

Figure 4:
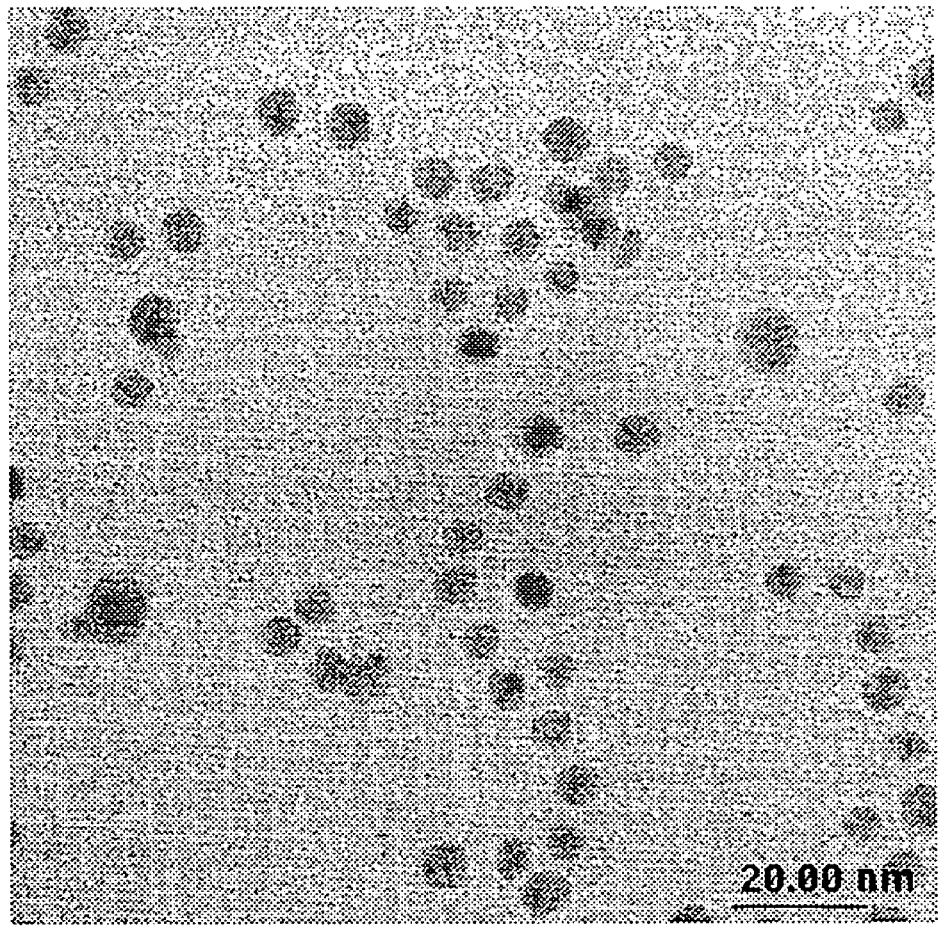
FIG. 4 shows a TEM photograph and particle diameter distribution of silver nanoparticles prepared in Example 5 according to the present invention.
Figure 4:
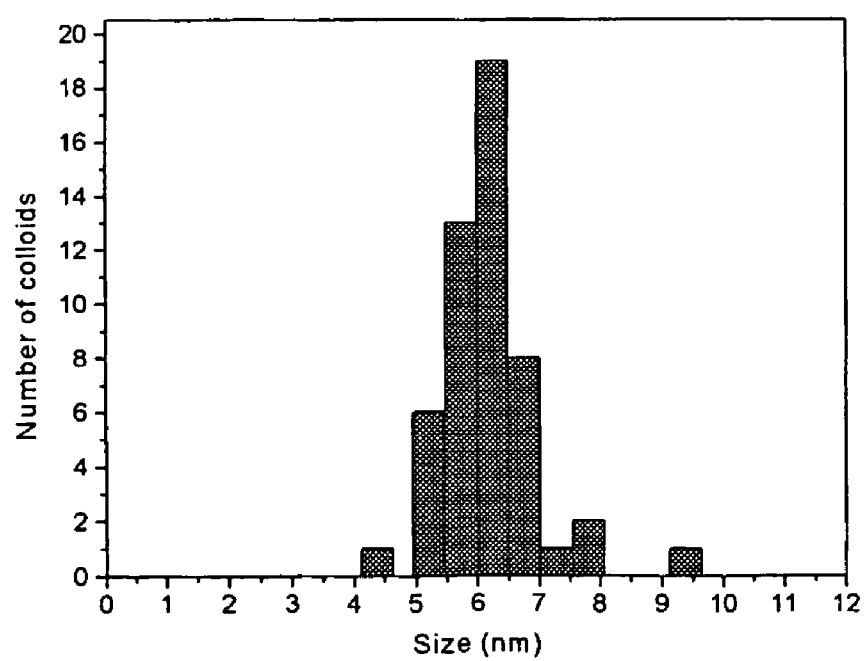

Particle diameter and particle diameter distribution were observed for the prepared silver nanoparticle colloid solution by using a transmission electron microscope (TEM). The results are shown in FIG. 4. As shown in FIG. 4, the silver nanoparticle colloid solution had a very uniform particle diameter distribution and a small, uniform particle diameter of 6.02±0.8 nm on average.

Figure 5:
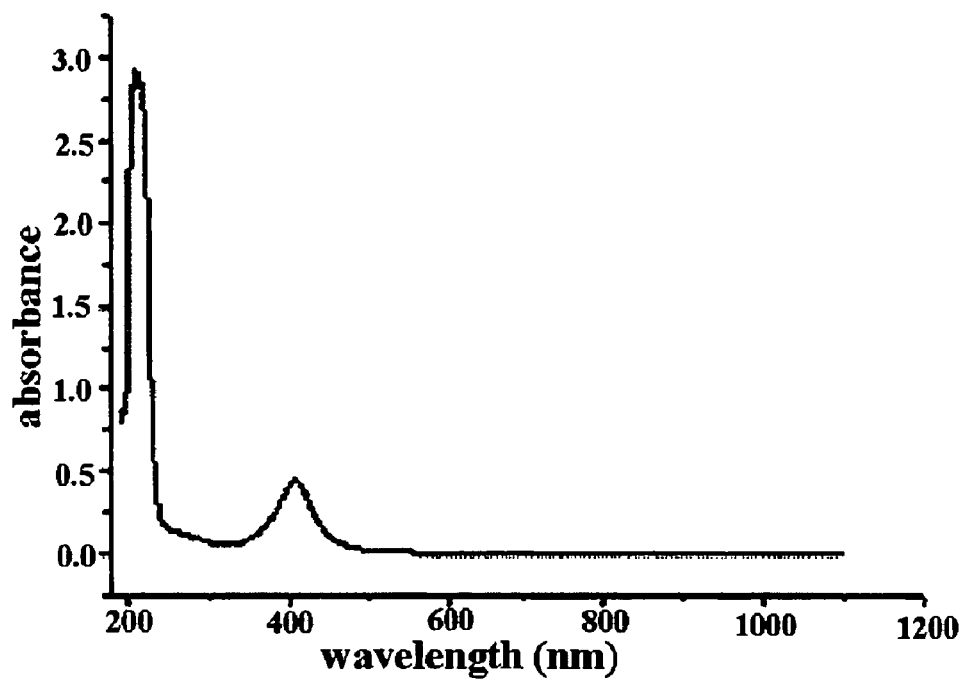
FIG. 5 shows the UV/VIS absorption spectrum of the silver nanoparticles prepared in Example 5 according to the present invention at 405 nm.

The formation of the silver nanoparticles was identified by UV/VIS spectrometry. The result is shown in FIG. 5. As shown in FIG. 5, an absorption peak of the silver nanoparticles appeared at 405 nm.

EXAMPLE 6

Solid Paste of Silver-Polyacrylamide Nanocomposites Prepared by Using Polyacrylamide as a Stabilizer 592 g water, 1.863 g $AgNO_3$, and 395 g isopropyl alcohol were mixed together, and 11.137 g polyacrylamide was added to the mixture and vigorously stirred. A reaction container containing the solution was purged with nitrogen gas for 1 hour and completely tightened, followed by gamma-rays radiation of a dosage of 30 KGy, thereby to attain a paste of precipitates. The solvent was removed from the paste, followed by vacuum drying. As a result, silver-polyacrylamide nanocomposites were obtained. The dried silver-polyacrylamide nanocomposites were dispersed in water.

Figure 6:
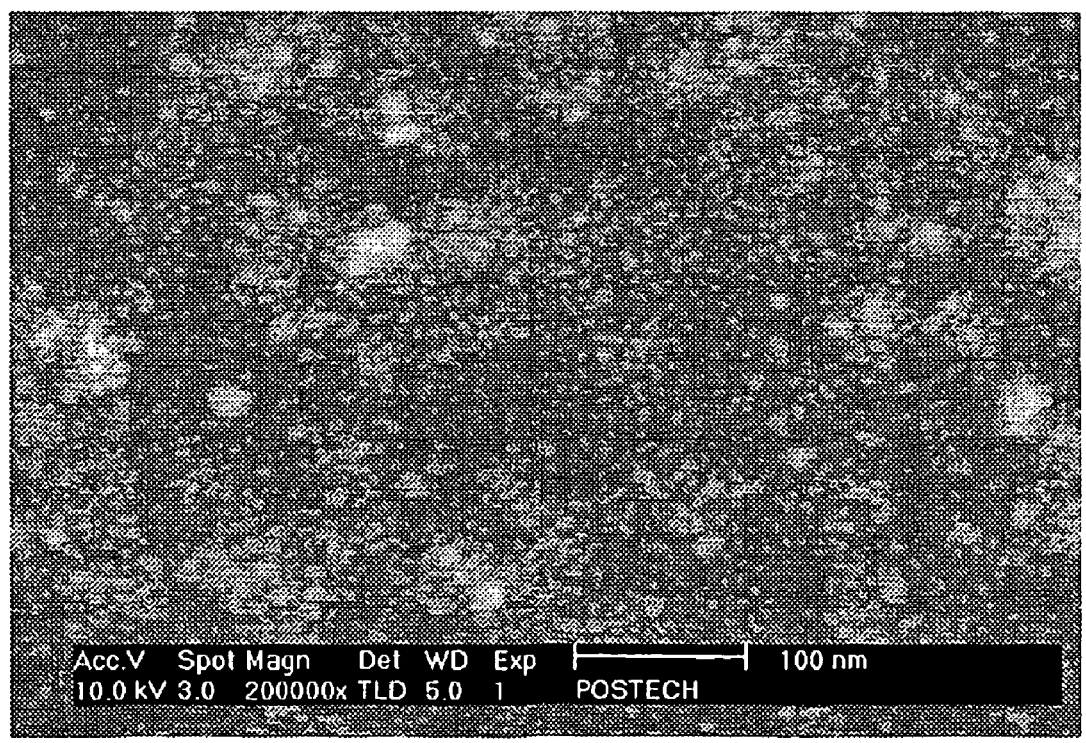
FIG. 6 is a field emission scanning electron microscopic (FESEM) photograph of a paste of silver-polymer nanocomposites prepared in Example 6 according to the present invention.

The solid paste of the silver-polyacrylamide nanocomposites was observed by field emission scanning electron microscopy (FESEM). The result is shown in FIG. 6. As shown in FIG. 6, the silver-polyacrylamide nanocomposites had a particle diameter of 4-8 nm and a uniform particle shape.

EXAMPLE 7

Figure 7:
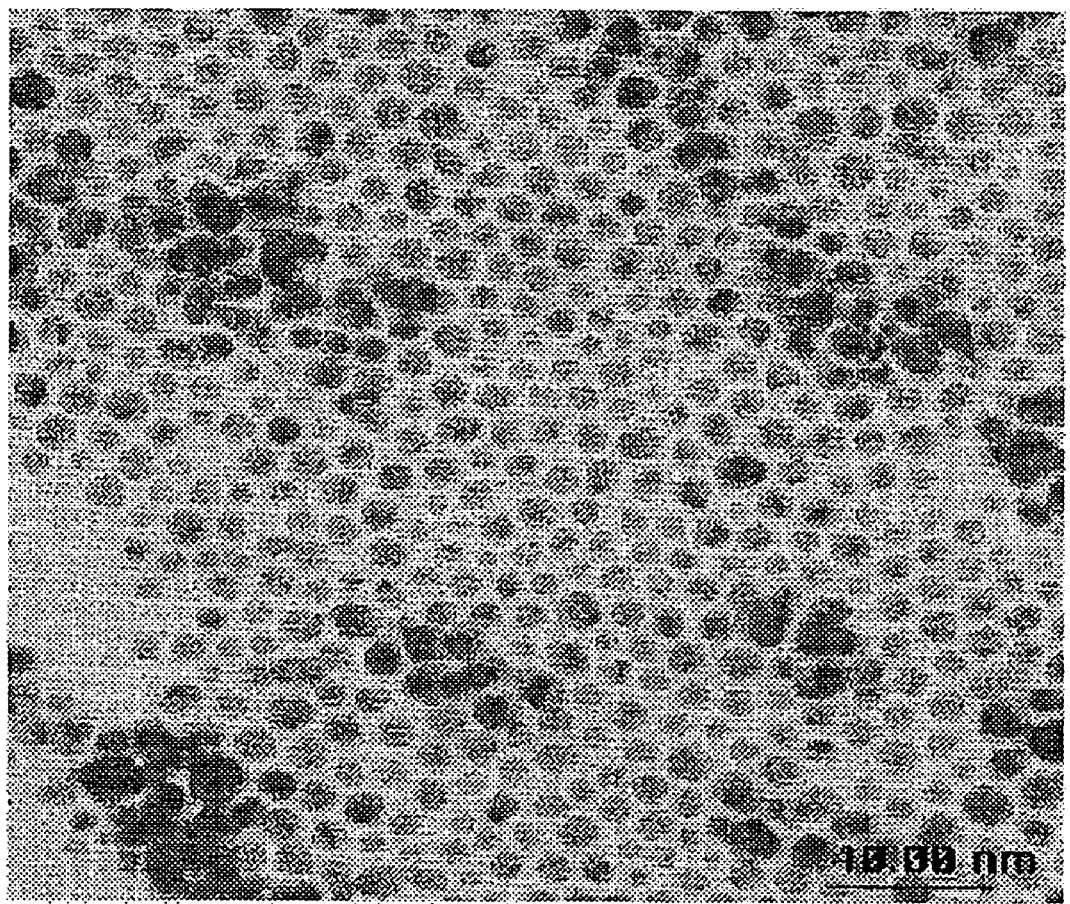
FIG. 7 shows a TEM photograph and particle diameter distribution of a dispersion of silver-polymer nanocomposites prepared in Example 7 according to the present invention in chloroform.
Figure 7:
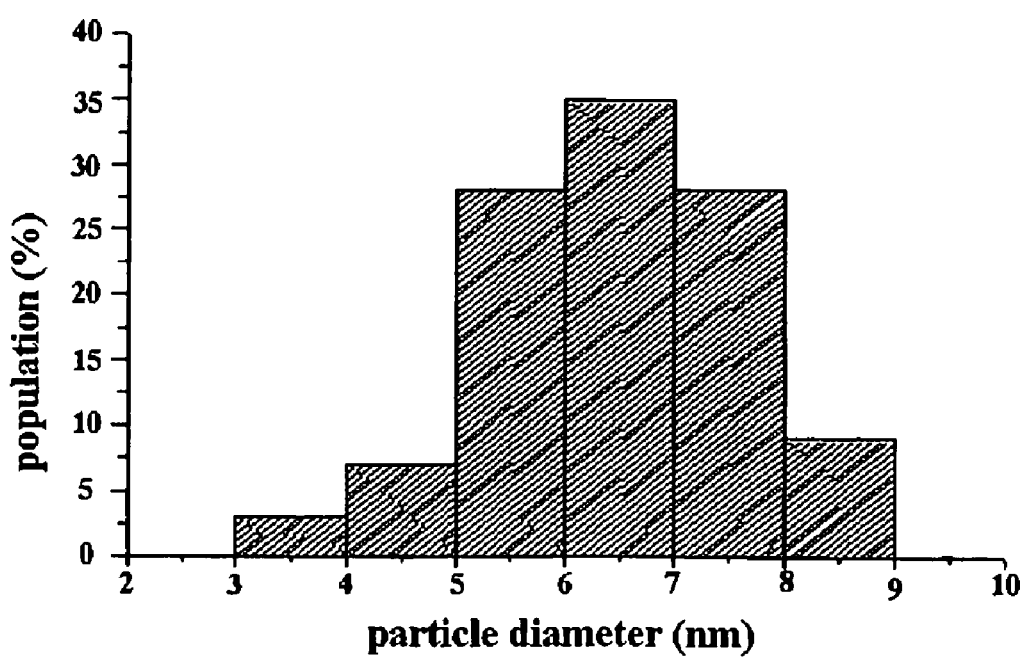

Solid Paste of Silver-Poly(Methyl Methacrylate) Nanocomposites Prepared by Using Poly(Methyl Methacrylate) as a Stabilizer 592 g water, 1.863 g $AgNO_3$, and 395 g isopropyl alcohol were mixed together, and 11.137 g poly(methyl methacrylate) was added to the mixture and vigorously stirred. Twin-81 as a surfactant was added little by little to the mixture with stirring until a white emulsion is formed. A reaction container containing the emulsion was purged with nitrogen gas for 1 hour and completely tightened, followed by gamma-rays radiation of a dosage of 30 KGy, thereby to attain a solid paste of precipitates. The solvent was removed from the paste, followed by vacuum drying. As a result, silver-poly(methyl methacrylate) nanocomposites were obtained. The dried silver-poly(methyl methacrylate) nanocomposites were dispersed in chloroform and subjected to TEM to observe the silver particle diameter and shape. The result is shown in FIG. 7. As is apparent from the particle distribution of FIG. 7, the silver particles had an average diameter of 6.55±1.27 nm and a uniform particle diameter and shape.

Figure 8:
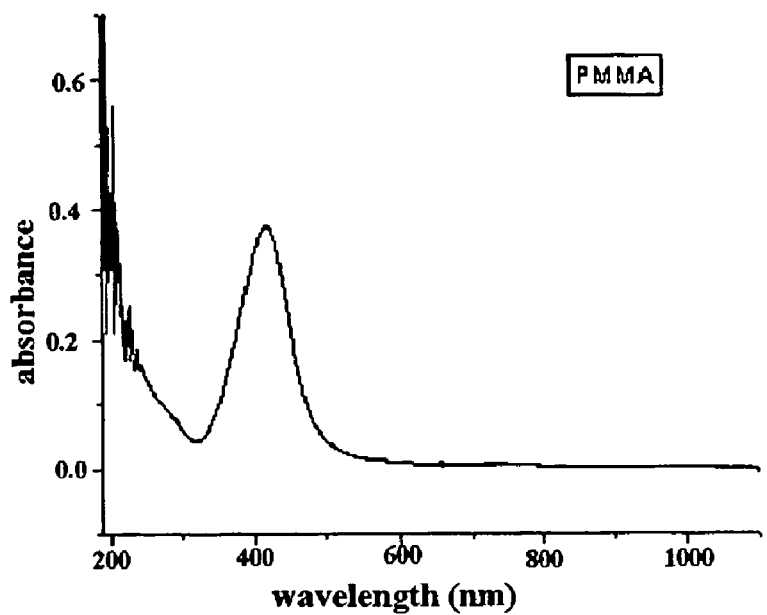
FIG. 8 shows the UVNIS absorption spectrum of the silver-polymer nanocomposites prepared in Example 7 according to the present invention at 405 nm.

The formation of the silver-poly(methyl methacrylate) nanocomposites was identified by UV/VIS spectrometry. The result is shown in FIG. 8. As shown in FIG. 8, an absorption peak of the nanocomposites appeared at 405 nm.

COMPARATIVE EXAMPLE

Among conventional silver nanoparticles prepared by gamma-rays radiation as in the present invention, silver nanoparticles prepared by using sodium dodecyl sulfate as a stabilizer were reported to have a smallest particle diameter of about 8 nm (*Mater. Lett.*, 1993, 17, 314). In this article, the silver nanoparticles had a considerably wide diameter distribution ranging from 5 nm to 37 nm, having an average particle diameter of 13 nm.

Regarding silver-polymer nanocomposites, silver-poly (butyl acrylate-co-styrene) nanocomposites prepared by gamma-rays irradiation of a water-in-oil emulsion were reported to have an average particle diameter of 8.5 nm (*Chem. Commun.* 1998, 941). In this article, the particle diameter distribution was not apparent due to low magnification of the TEM photograph.

EXPERIMENTAL EXAMPLE 1

Stability of Silver Nanoparticle Colloid Solution

Figure 9:
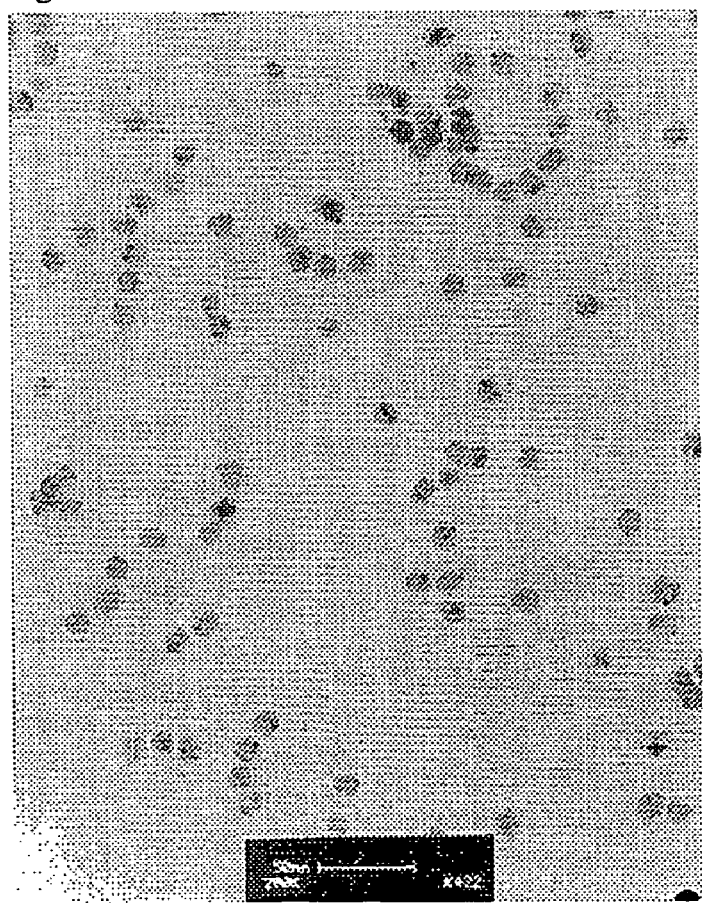
FIG. 9 is a TEM photograph of a silver nanoparticle colloid solution prepared in Example 1 according to the present invention after being left for 10 months at room temperature.

To determine stability of the silver nanoparticle colloid solution prepared in Example 1, the silver nanoparticle colloid solution was left for 10 months at room temperature and observed by TEM. The result is shown in FIG. 9. As shown in FIG. 9, the particle size was slightly increased, but the particle shape and the colloid state were stably maintained without precipitation.

EXPERIMENTAL EXAMPLE 2

Interaction Between Silver and Polyvinyl Pyrrolidone

Figure 10:
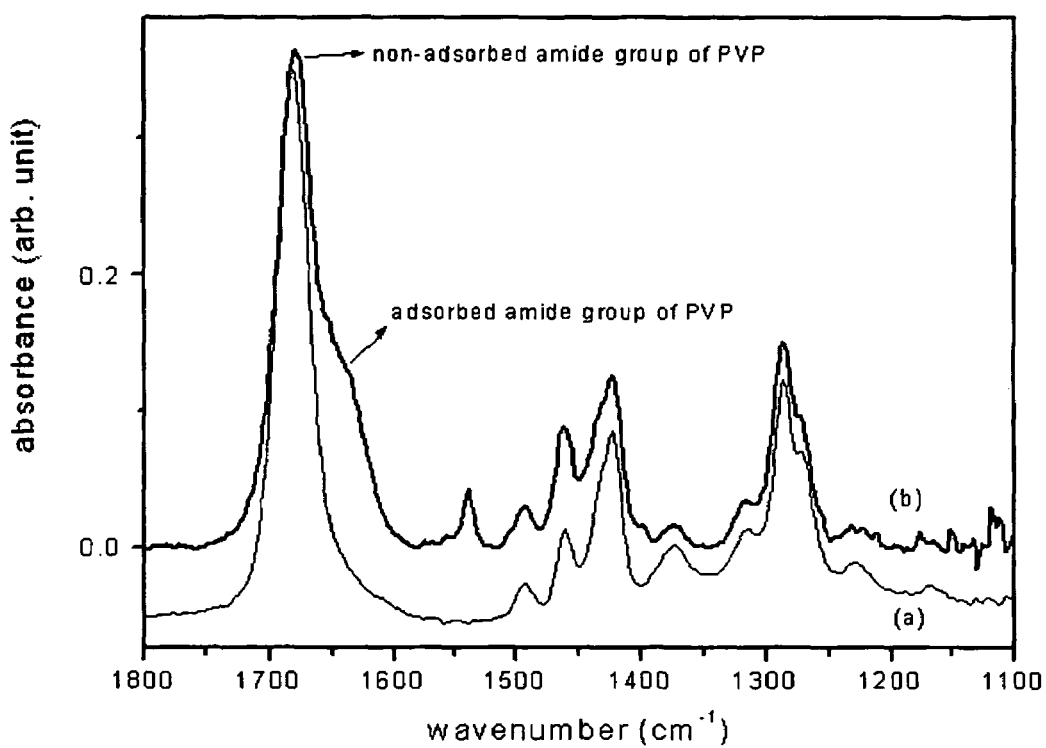
FIG. 10 shows the infrared (IR) spectrum of a silver nanoparticle colloid solution prepared in Example 2 according to the present invention.

An Infrared (IR) spectrum was measured for the silver nanoparticle colloid solution prepared in Example 2 to determine whether the silver and the polyvinyl pyrrolidone interact. The result is shown in FIG. 10. In FIG. 10, (a) is the IR spectrum for polyvinyl pyrrolidone alone, and (b) is the IR spectrum for the silver nanoparticles prepared in Example 2 by using the polyvinyl pyrrolidone as a stabilizer. It is evident from the results of FIG. 10 that the silver and the polyvinyl pyrrolidone interact in the colloid solution.

EXPERIMENTAL EXAMPLE 3

Surface Enhanced Raman Scattering Measurement

Figure 11:
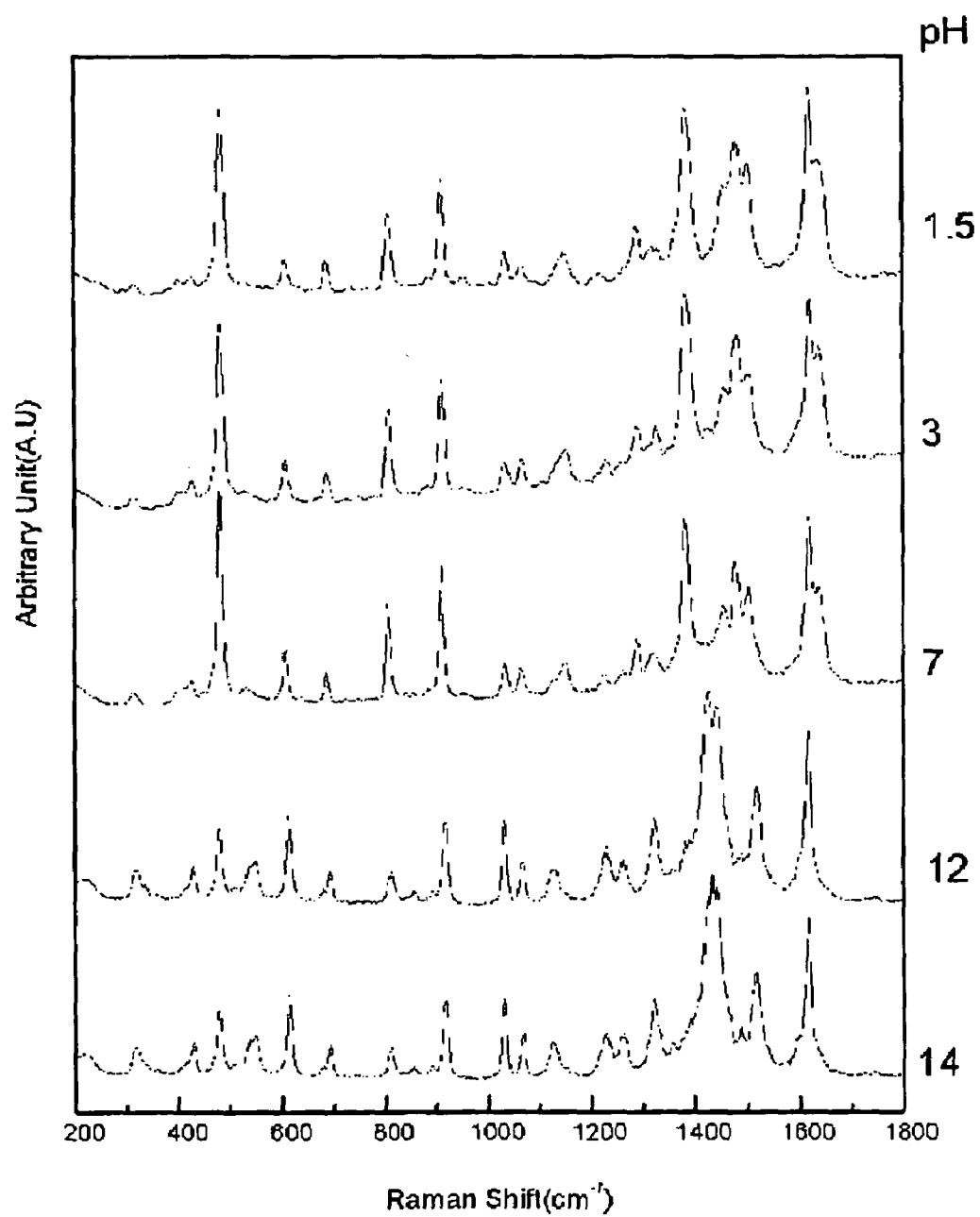
FIG. 11 shows the surface enhanced Raman scattering spectrum of the silver nanoparticles prepared in Example 2 according to the present invention with respect to pH of a $1.0 \times 10^{-5}$ M thionin solution.

Surface enhanced Raman scattering occurs in silver nanoparticle colloid solutions. The Raman scattering spectrum of the silver nanoparticles prepared in Example 2 was measured with respect to pH of a $1.0 \times 10^{-5}$ M thionin solution. The results are shown in FIG. 11. The results of FIG. 11 show that the silver nanoparticles can be applied to surface enhanced Raman spectroscopy for assaying a trace of organic substances, including bioorganic substances.

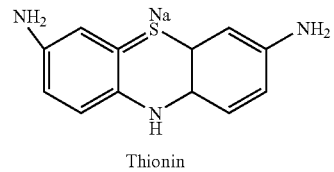

Thionin

EXPERIMENTAL EXAMPLE 4

Antibacterial Activity Test in Textile

Antibacterial activity was measured in a textile soaked with the silver nanoparticle colloid solution prepared in Example 2, according to the method of KS K 0693. The silver nanoparticle colloid solution of Example 2 was diluted with water to 0.5%, 1.0%, and 1.5%, and textiles were immersed in each of the diluted sample solutions. *Staphylococcus aureus* (ATCC 6538) strain was used for the antibacterial activity test. The results for each of the samples are shown in Table 1 below. As shown in Table 1, the silver nanoparticle colloid solution according to the present invention showed a 99.9% antibacterial activity for all colloid dilutes.

TABLE 1

| Sample | Antibacterial Activity (% on average) |
|---|---|
| 0.5% | 99.9% |
| 1.0% | 99.9% |
| 1.5% | 99.9% |

Figure 12:
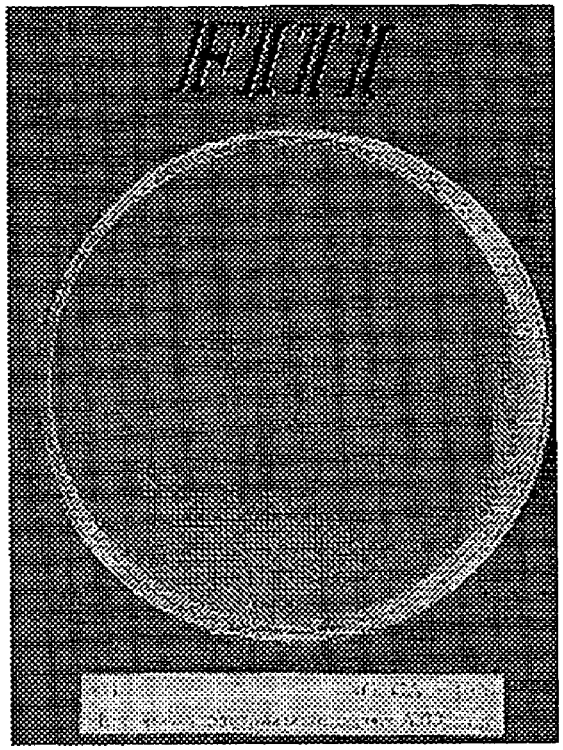
FIG. 12 shows the result of an antibacterial activity test of a textile soaked with the silver nanoparticle colloid solution prepared in Example 2 according to the present invention.
Figure 13:
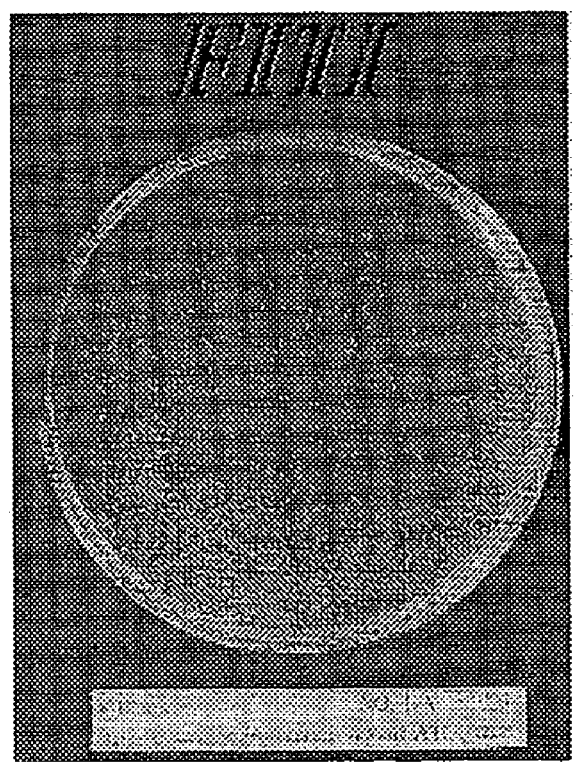
FIG. 13 shows the result of an antibacterial activity test of a textile soaked with a solution containing no silver nanoparticles according to the present invention.

In samples containing no silver nanoparticle colloid solution according to the present invention, white spots by the *Staphylococcus aureus* (ATCC 6538) strain were observed, as shown in FIG. 13. In contrast, in the samples containing the silver nanoparticle colloid solution according to the present invention, the *Staphylococcus aureus* (ATCC 6538) strain was hardly observed, as shown in FIG. 12.

According to the present invention, a metal nanoparticle colloid solution and metal-polymer nanocomposites having a uniform particle diameter and shape can be prepared at room temperature on a large scale. Conventional methods using a reducing agent are ineffective to prepare uniform particles on a large scale. As is apparent from the observation by TEM, the metal nanoparticles according to the present invention have a more uniform, smaller particle diameter and shape, compared to metal nanoparticles that have been reported to date, and thus a great surface area to volume ratio. Therefore, the metal nanoparticle colloid solution and metal-polymer nanocomposites according to the present invention have a high level of antibacterial activity even when only a trace is used. The metal nanoparticles according to the present invention have a nano-scaled particle size and are greatly adsorptive due to polymer surrounding individual particles, and thus shows an effect of shielding electromagnetic waves when applied to the field of thin film coating, in addition to antibacterial and sterilizing effects.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for preparing metal-polymer nanocomposites, comprising:
   dissolving a metal salt and a polymeric stabilizer in a solvent mixture of water and a non-aqueous solvent;
   purging a reaction container containing the solution with nitrogen or argon gas; and
   radiating radioactive rays onto the solution to obtain precipitates, wherein said polymeric stabilizer is selected from the group consisting of polyethylene, polyacrylonitrile, poly(methyl (meth)acrylate), polyurethane, and polyethylene glycol.

2. The method of claim 1, wherein the metal salt is a salt of at least one metal selected from the group consisting of silver, copper, nickel, palladium, and platinum.

3. The method of claim 2, wherein the metal salt is a silver salt.

4. The method of claim 3, wherein the silver salt is selected from the group consisting of silver nitrate, silver perchlorate, silver sulfate, and silver acetate.

5. The method of claim 1, wherein a surfactant is added to the solvent mixture of water and the non-aqueous solvent together with the metal salt and the polymeric stabilizer to form an emulsion.

6. The method of claim 5, wherein the surfactant is polyoxyethylene sorbitan mono-oleate.

7. The method of claim 1, wherein the non-aqueous solvent is an alcoholic solvent.

8. The method of claim 7, wherein the alcoholic solvent is at least one selected from the group consisting of isopropyl alcohol, methanol, ethanol, and ethylene glycol.

9. The method of claim 1, further comprising dilution and ultrasonic treatment after the formation of the precipitates.

10. Metal-polymer nanocomposites prepared by the method according to any one of claims 1 through 8.

11. A product comprising the metal-polymer nanocomposite of claim 1, wherein said product is selected from the group consisting of an antibacterial agent, a sterilizer, a conductive adhesive, conductive ink, and an electromagnetic wave shielder for an image display.

* * * * *